C. B. ANDERSON
E. C. McRAE
J. R. FAULKNER
T. H. OSTER
INVENTOR.
BY
ATTORNEYS

United States Patent Office 2,856,247
Patented Oct. 14, 1958

2,856,247

BEARING ASSEMBLY

Chester B. Anderson, Dearborn, Mich., assignor to Ford Motor Company, Dearborn, Mich., a corporation of Delaware Application October 18, 1956, Serial No. 616,664

4 Claims. (Cl. 308—212)

This invention relates generally to a bearing assembly. In an embodiment of the invention, a bearing race is adapted to be received within the bore of a housing member having a radially inwardly projecting annular flange formed with an axially tapered inner surface. The bearing race houses antifriction bearing elements axially retained in position by a pair of spaced retaining rings. One of the retaining rings has an integral axial portion projecting beyond the end of the bearing race and formed with a radially outwardly projecting annular marginal flange having an axially tapered outer surface adapted to engage the tapered inner surface of the flange on the housing member. The last named retaining ring is split circumferentially and is distortable radially to enable it to snap over the flange on the housing member upon relative axial movement between the housing member and the bearing race to lock the bearing race in the housing against axial displacement in either direction. The assembly of the bearing within the housing is thus simplified since interlocking engagement is automatically made between the two by moving the bearing axially into the bore of the housing. Economy of assembly is thus achieved.

Other objects and advantages of this invention will be made more apparent as this description proceeds, particularly when considered in connection with the accompanying drawings, wherein.

Figures 1, 2, 3:
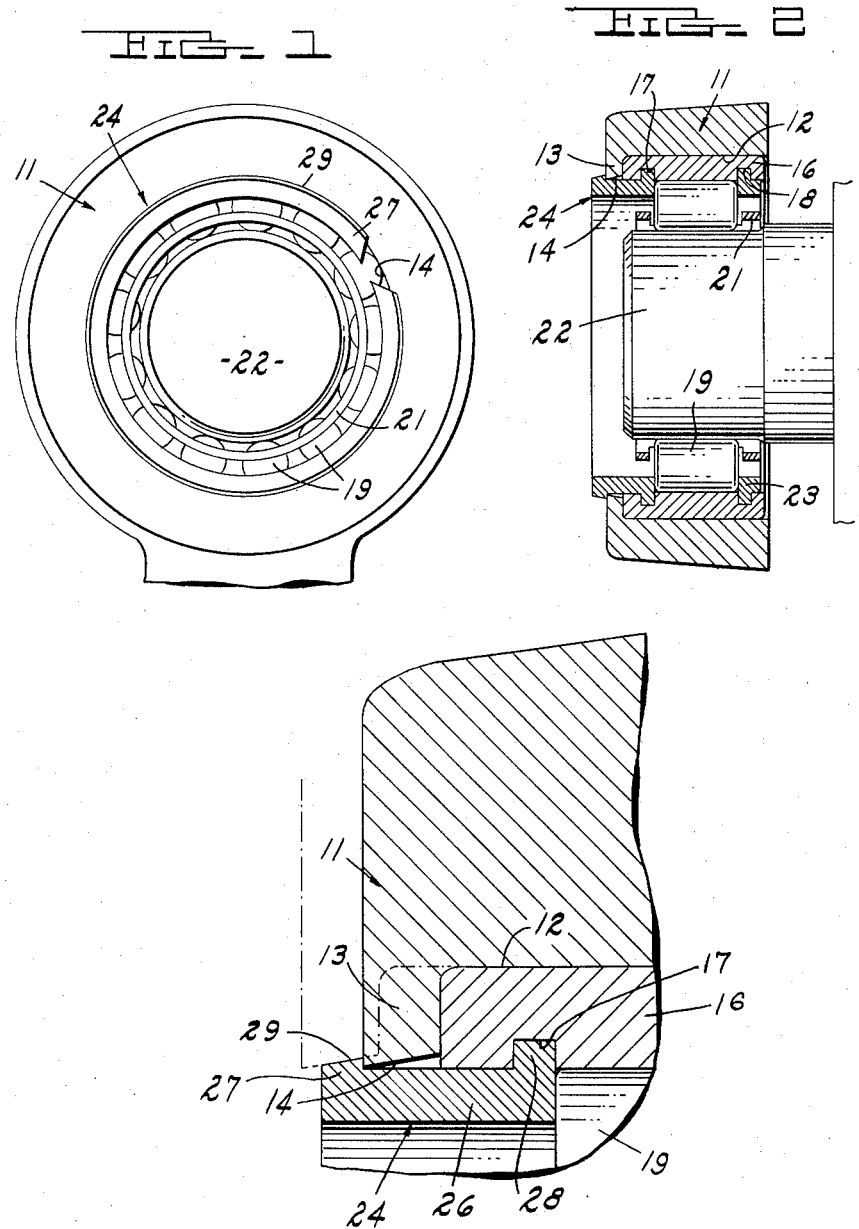
Figure 1 is an end elevation of a bearing assembly incorporating the present invention.
Figure 2 is a cross sectional view through the construction shown in Figure 1.
Figure 3 is an enlarged fragmentary sectional view of a portion of Figure 2.

Referring now to the drawings, the reference character 11 indicates a housing member having a cylindrical bore 12 and an integral radially inwardly projecting marginal flange 13 at one end. The flange 13 has an axially tapered inner surface 14, for a purpose to be described more in detail hereinafter.

An annular bearing race 16 is adapted to be received within the bore 12 of the housing member 11 and to be positioned in abutting relationship with the housing flange 13, which forms a shoulder limiting movement of the bearing race relative to the housing member in one direction. The bearing race 16 is formed with a pair of axially spaced annular grooves 17 and 18 formed on its inner surface. The bore of the bearing race 16 also forms a bearing surface for a plurality of antifriction roller bearings 19 assembled within a bearing cage 21 and engageable with the outer periphery of a shaft 22 rotatably mounted therein.

A circumferentially split resilient retaining ring 23 is received within the groove 18 in the bearing race 16 at one end of the roller bearings 19 to form a retainer therefor. A second circumferentially split retaining ring 24 serves as a retainer at the opposite ends of the roller bearings 19.

As best seen in Figure 3, the retaining ring 24 has an axially extending central web 26 and a pair of axially spaced radially outwardly projecting marginal flanges 27 and 28. The marginal flange 28 is adapted to be received within the groove 17 in the bearing race 16. It will be noted that the web portion 26 of the retaining ring projects axially beyond the adjacent end of the bearing race 16 so that the marginal flange 27 is spaced axially from the end of the bearing race to form a space therebetween corresponding to the width of the flange 13 of the housing member 11.

The outer periphery of the marginal flange 27 of the retaining ring 24 is formed with an axially tapered outer surface 29 having a taper corresponding to the inner tapered surface 14 of the flange 13 of the housing member.

The roller bearings 19 and the retaining rings 23 and 24 are assembled within the bearing race 16, and this subassembly is then moved axially into the bore 12 in the housing member 11 until the tapered outer surface 29 of the retaining ring flange 27 engages the tapered inner surface 14 of the housing flange 13. Continued relative axial movement radially contracts the circumferentially split retaining ring 24 so that the flange 27 snaps over the flange 13 of the housing member into the interlocking relationship shown in the drawings. In the assembled position, as shown, the housing flange 13 is held between the bearing ring flange 27 and the adjacent end of the bearing race 16, and it will be seen that the bearing race is thus held against axial displacement in either direction. The assembly operation is thus simplified, yet the unit may be readily disassembled by contracting the bearing ring 24 by means of a suitable tool so that the flange 27 will pass within the housing flange 13.

It will be understood that the invention is not to be limited to the exact construction shown and described, but that various changes and modifications may be made without departing from the spirit and scope of the invention, as defined in the appended claims.

What is claimed is:

1. In a bearing assembly, a housing member having a cylindrical bore, a bearing race member receivable in the bore of said housing member, a plurality of antifriction bearings mounted within said bearing race member, one of said members having a groove formed in its inner surface and the other of said members having an axially tapered inwardly facing surface formed thereon, a circumferentially split radially distortable retaining ring having a pair of axially spaced radially outwardly projecting flanges, one of the flanges of said retaining ring being receivable within the groove in said one member and the other of said flanges having an axially tapered outer surface engageable during assembly with the axially tapered surface of said other member for snap interlocking engagement therewith.

2. In a bearing assembly, a housing member having a cylindrical bore and a radially inwardly projecting annular flange forming a shoulder, said annular flange having an axially tapered inner surface, an annular bearing race slidable into the bore of said member into abutting relationship with said flange, said bearing race having a pair of axially spaced annular grooves formed in its inner surface, antifriction bearings received within said bearing race, and a pair of retaining rings engageable with the grooves in said bearing race and retaining said antifriction bearings therebetween, one of said retaining rings having an axial portion extending outwardly beyond one end of said bearing race, the extending portion of said last named retaining ring having a radially outwardly projecting marginal flange, said marginal flange having an axially tapered outer peripheral surface engageable during assembly with the tapered inner surface of the inwardly projecting flange of the housing member, said last named retaining ring being split circumferentially and distortable radially to snap over said last named flange to retain the bearing race in said housing member against axial displacement in either direction.

3. In a bearing assembly, a housing member, a bearing race member carried by said housing member, a plurality of antifriction bearings engageable with said bearing race member, one of said members having an axially tapered radially facing surface, a circumferentially split radially distortable retaining ring connected to the other of said members and having an axially tapered radially facing surface engageable during assembly with the axially tapered surface of said one member for snap interlocking engagement therewith.

4. In a bearing assembly, a housing, said housing having an annular flange provided with a radially facing axially tapered surface, a bearing race carried by said housing, antifriction bearings engageable with said bearing race, and a retaining ring carried by said bearing race and retaining said antifriction bearings, said retaining ring having an annular flange provided with a radially facing axially tapered surface thereon engageable during assembly with the tapered surface of the flange of said housing, the flange of said retaining ring being distortable radially to snap past the flange of said housing to retain the bearing race against axial displacement with respect to said housing.

References Cited in the file of this patent

UNITED STATES PATENTS

| | | |
|---|---|---|
| 1,104,174 | Duffy | July 21, 1914 |
| 1,534,123 | Johnson | Apr. 21, 1925 |
| 1,611,240 | Sanford | Dec. 21, 1926 |
| 1,724,983 | Weiss | Aug. 20, 1929 |
| 2,075,280 | Green | Mar. 30, 1937 |
| 2,676,074 | Nusbaum | Apr. 20, 1954 |